(12) United States Patent
Haynes et al.

(10) Patent No.: US 7,890,595 B2
(45) Date of Patent: Feb. 15, 2011

(54) METHOD OF AND SYSTEM FOR PROVIDING ENHANCED USER CONTROL OF COMPUTER CHAT

(75) Inventors: Thomas R. Haynes, Apex, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 11/844,017

(22) Filed: Aug. 23, 2007

(65) Prior Publication Data

US 2009/0055500 A1 Feb. 26, 2009

(51) Int. Cl.
*G06F 15/16* (2006.01)

(52) U.S. Cl. ...................................... 709/207; 709/206

(58) Field of Classification Search .................. 709/207, 709/206
See application file for complete search history.

(56) References Cited

U.S. PATENT DOCUMENTS

| | | | |
|---|---|---|---|
| 6,405,225 B1* | 6/2002 | Apfel et al. | 715/210 |
| 2002/0057284 A1* | 5/2002 | Dalby et al. | 345/700 |
| 2003/0055908 A1* | 3/2003 | Brown et al. | 709/207 |
| 2004/0254998 A1* | 12/2004 | Horvitz | 709/206 |
| 2005/0223077 A1* | 10/2005 | Vellanki et al. | 709/207 |
| 2006/0026254 A1* | 2/2006 | Kessen et al. | 709/207 |
| 2006/0036703 A1* | 2/2006 | Fulmer et al. | 709/207 |

* cited by examiner

*Primary Examiner* — Joon H Hwang
*Assistant Examiner* — Sherman Lin
(74) *Attorney, Agent, or Firm* — Jeffrey T. Holman

(57) ABSTRACT

A method of and system for providing enhanced user control of computer chat minimize a chat window in response to user input and then restore the chat window in response to receipt of a message from a sender, in which the message has a predetermined characteristic. The user input may include activation of an intelligent or smart minimize function. An example of a predetermined characteristic that may cause the chat window to be restored in the intelligent minimized mode is the presence of the user's name in a chat message. Other examples of predetermined characteristics that may cause the chat window to be restored include the text of the message being in a bold font or otherwise marked as being urgent, the sender of the message being on an exception list or occupying a management position with respect to the recipient. Embodiments may include a shout function by which a sender can override the intelligent mode. Embodiments include informing the other chat participants when a participant is in intelligent minimize mode.

16 Claims, 4 Drawing Sheets

METHOD OF AND SYSTEM FOR PROVIDING ENHANCED USER CONTROL OF COMPUTER CHAT

BACKGROUND OF THE INVENTION

1. Technical Field

The present invention relates generally to the field of computer chat, and more particularly to a method of and system for providing an intelligent minimize chat function.

2. Description of the Related Art

Computer chat and instant messaging have become popular means of communication both in the workplace and in individual personal computing. Chat sessions are implemented with chat clients installed on networked computers. A chat client displays a window on a user's desktop. Chat messages from others are displayed in the window and the user can send a message to others by typing the message into the window.

Typically, whenever a message is received during the chat session, the chat window is surfaced on the user's desktop and it becomes the user's focus. Thus, if the user is working on another application window when a chat message arrives, the user's attention is diverted away from the other application window and the chat window becomes the active window on the user's desktop. In some chat systems, there is a setting that prevents a minimized window from popping to the top of the stack on the users desktop when a new message arrives. In those systems, the receipt of a new message is indicated by a blinking icon or the like. The user can look to see if the new message is of interest, but in doing so the user must divert attention from the current focus.

Currently, a user can enter a do not disturb (DND) mode in which incoming chat messages are not received. However, the current DND mode may be overly restrictive. For example, a user can send chat messages while the user is in DND mode. The user intends to communicate with the recipient of the chat message but does not want to be bothered with messages from others. The current DND mode prevents messages from being received even from the sender with whom the user wants to communicate. Additionally, a user may wish to participate to a limited extent in a chat session without having the chat session be the constant focus of his or her attention. For example, the user may wish to do other work during the chat session but be able to respond or comment when his or her input is needed. The currently existing chat settings do not provide that ability.

SUMMARY OF THE INVENTION

The present invention provides a method of and system for providing enhanced user control of computer chat. Embodiments of the method of the present invention minimize a chat window in response to user input and then restore the chat window in response to receipt of a message from a sender, in which the message has a predetermined characteristic. In some embodiments of the present invention, the user input may include activation of an intelligent or smart minimize function. An example of a predetermined characteristic that may cause the chat window to be restored in the intelligent minimized mode is the presence of the user's name in a chat message. Other examples of predetermined characteristics that may cause the chat window to be restored include the text of the message being in a bold font or otherwise marked as being urgent, the sender of the message being on an exception list or occupying a management position with respect to the recipient. Embodiments of the invention may include a shout function by which a sender can override the intelligent mode. Embodiments of the invention may include means for informing the other chat participants when a participant is in intelligent minimize mode.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
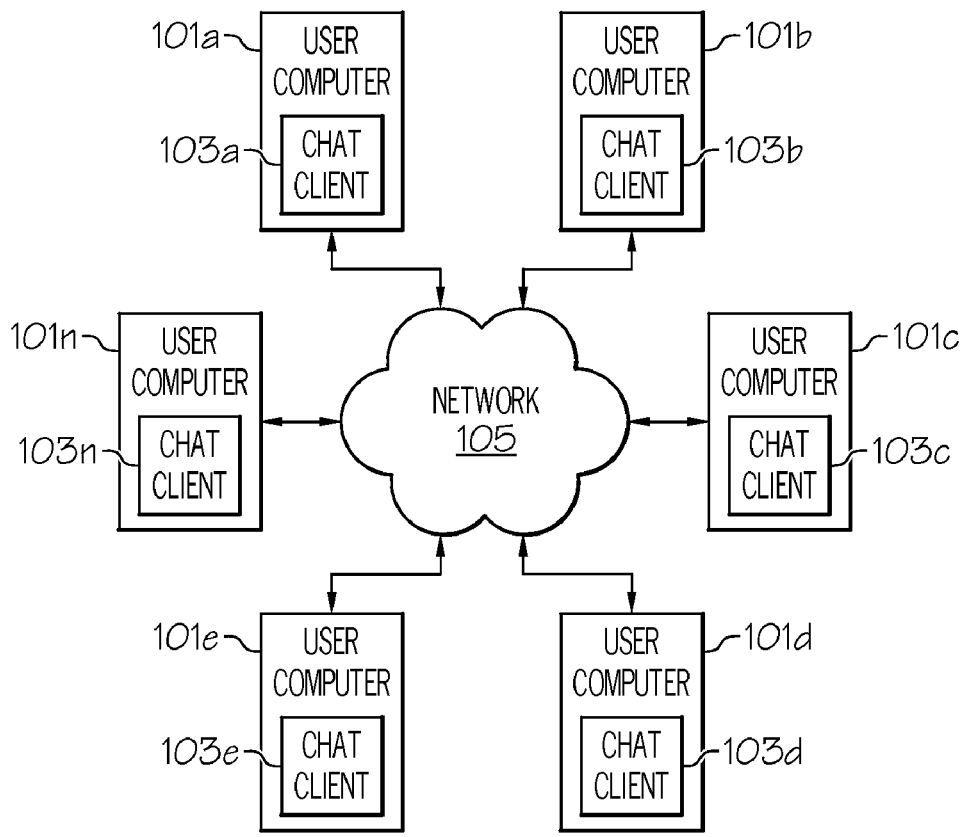
FIG. 1 is a block diagram of an embodiment of a system according to the present invention.

Referring now to the drawings, and first FIG. 1, a system according to the present invention is designated generally by the numeral 100. System 100 includes a plurality of user computers 101. A user computer 101 may be a personal computer, a notebook computer, a workstation, a personal digital assistant or other mobile, or any other computing device. Each user computer 101 includes a chat client 103. Chat client 103 may be any of several well-known chat clients. Each user computer 101 is coupled to a network, indicated generally at 105. Network 105 may be any type of network, such as a local area network, a wide area network, the Internet, etc.

Figure 2:
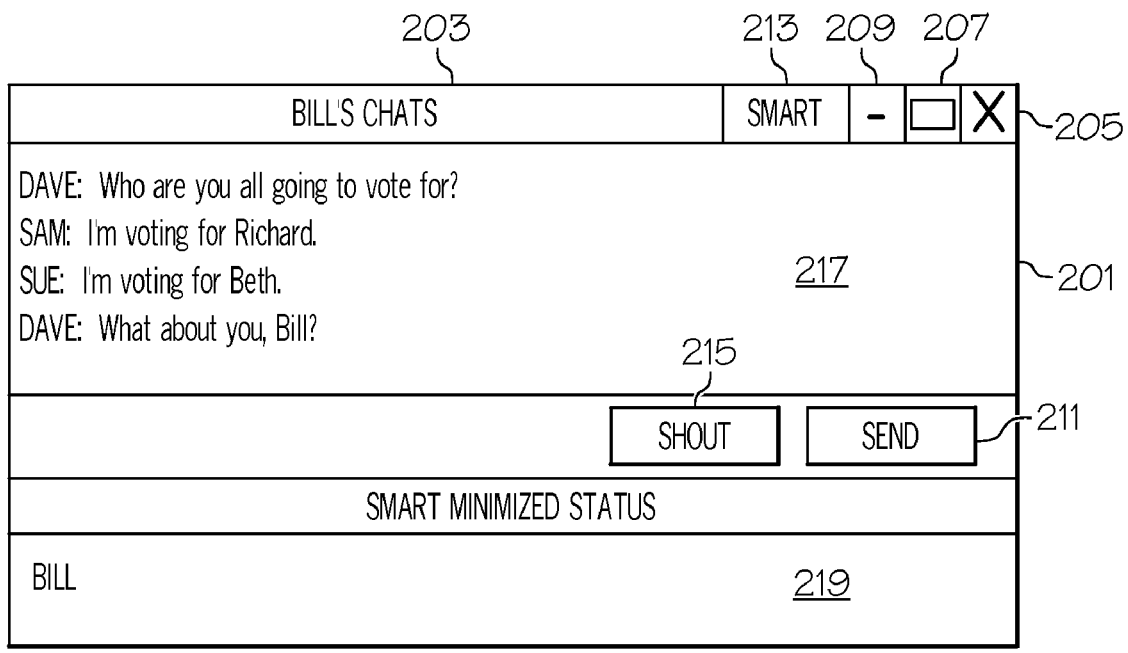
FIG. 2 illustrates a chat window.

FIG. 2 illustrates a chat window 201 according to an embodiment of the present invention. Chat window 201 is displayed on a computer display in a manner well-known to those skilled in the art. Chat window 201 includes a title bar 203. Title bar 203 identifies the user of the computer as "Bill." Chat window 201 includes the standard graphical user interface buttons, including a close button 205, a maximize button 207, a minimize button 209, and a send button 211. In addition, according to embodiments of the present invention, window 201 includes a smart or intelligent minimize button 213. As will be explained in detail hereinafter, actuation of smart minimize button 213 causes the user to enter a smart minimized mode. In the smart minimized mode, the chat window 201 is minimized but it can be automatically restored upon receipt of messages satisfying certain conditions. Chat window 201 includes a shout button 215, which causes a chat message to be sent in a manner similar to send button 211. However, actuation of shout button overrides any intelligent minimized modes that chat participants may have set. Chat window 201 includes a text field 217, which contains the content of the chat session. Chat window 201 also may include a smart minimize status area 219. Smart minimize status area 219 identifies chat participants who are in smart minimized mode. Alternatively, a chat participant's smart minimized status may be indicated in other ways, such as by highlighting that participant's name in content field 217.

Figure 3:
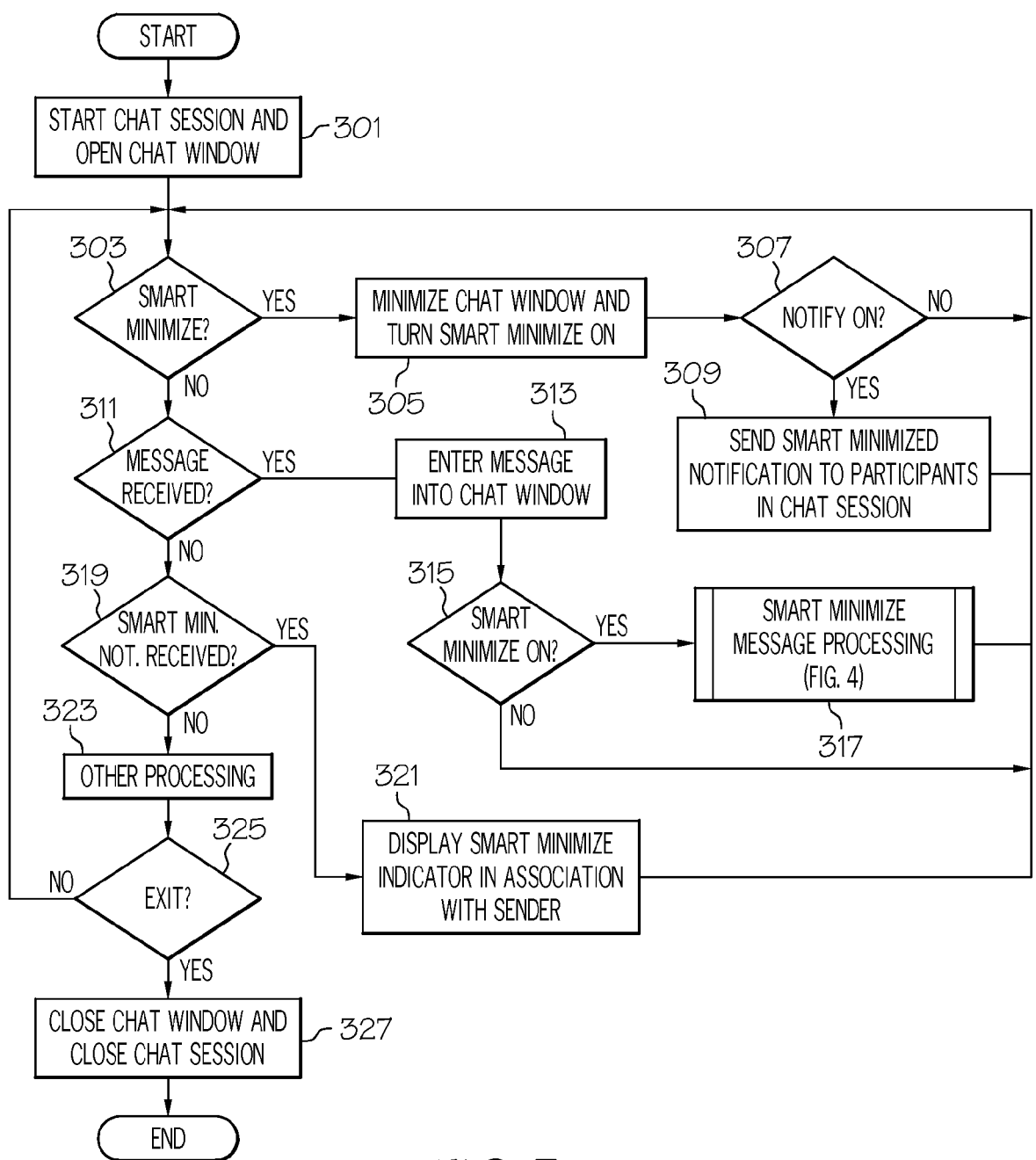
FIG. 3 is a flow chart of an embodiment of chat processing according to the present invention.

FIG. 3 is a flow chart of chat processing according to an embodiment of the present invention. A chat client starts a chat session and opens a chat window, as indicated at block 301. After starting the chat session and opening the chat window, the chat client waits for user input or the receipt of a message. If, as determined at decision block 303, the user actuates smart minimize button 213 of FIG. 2, the chat client minimizes or hides the chat window on the user's desktop and turns smart minimize on, as indicated at block 305. When the chat window is minimized it is not visible; however, the chat instance is still active and it can receive chat messages. After minimizing the chat window and turning on smart minimize, the chat client determines, at decision block 307, if notify is on. The user may configure the chat client to notify other chat participants when his or her smart minimize is on. Some chat participants may find it offensive to use smart minimize. Accordingly, users may not want others to know they are in smart minimize mode. If, as determined at decision block 307, notify is on, the chat client sends a smart minimized notification to the other participants, at block 309, returns to decision block 303.

Referring still to FIG. 3, if, as determined at decision block 311, a message is received, the chat client enters the message into the chat window, as indicated at block 313. The message is entered into the chat window whether or not the chat window is hidden or minimized. If the chat window is restored, all messages received while the chat window was hidden or minimized will be displayed. The chat client determines, at decision block 315, if smart minimize is on. If so, the chat client performs smart minimize message processing, as indicated generally at block 317, and shown in detail in FIG. 4.

Referring still to FIG. 3, if, as determined at decision block 319, the chat client receives a smart minimize notification, the chat client displays a smart minimize indicator in association with the sender, as indicated at block 321. A smart minimize indicator may include displaying the sender's name in smart minimize status area 219 of FIG. 2. Embodiments of the invention may provide other indicators, such as highlighting the sender's name in chat area 217 of FIG. 2.

During the chat session, the chat client may perform other processing, indicated generally at block 323. Examples of other processing include normal minimizing, moving, and resizing the chat window, and other well-known operations. If, as determined at decision block 325, the user exits the chat session, the chat client closes the chat window and closes the chat session, as indicated at block 327, and processing ends.

Figure 4:
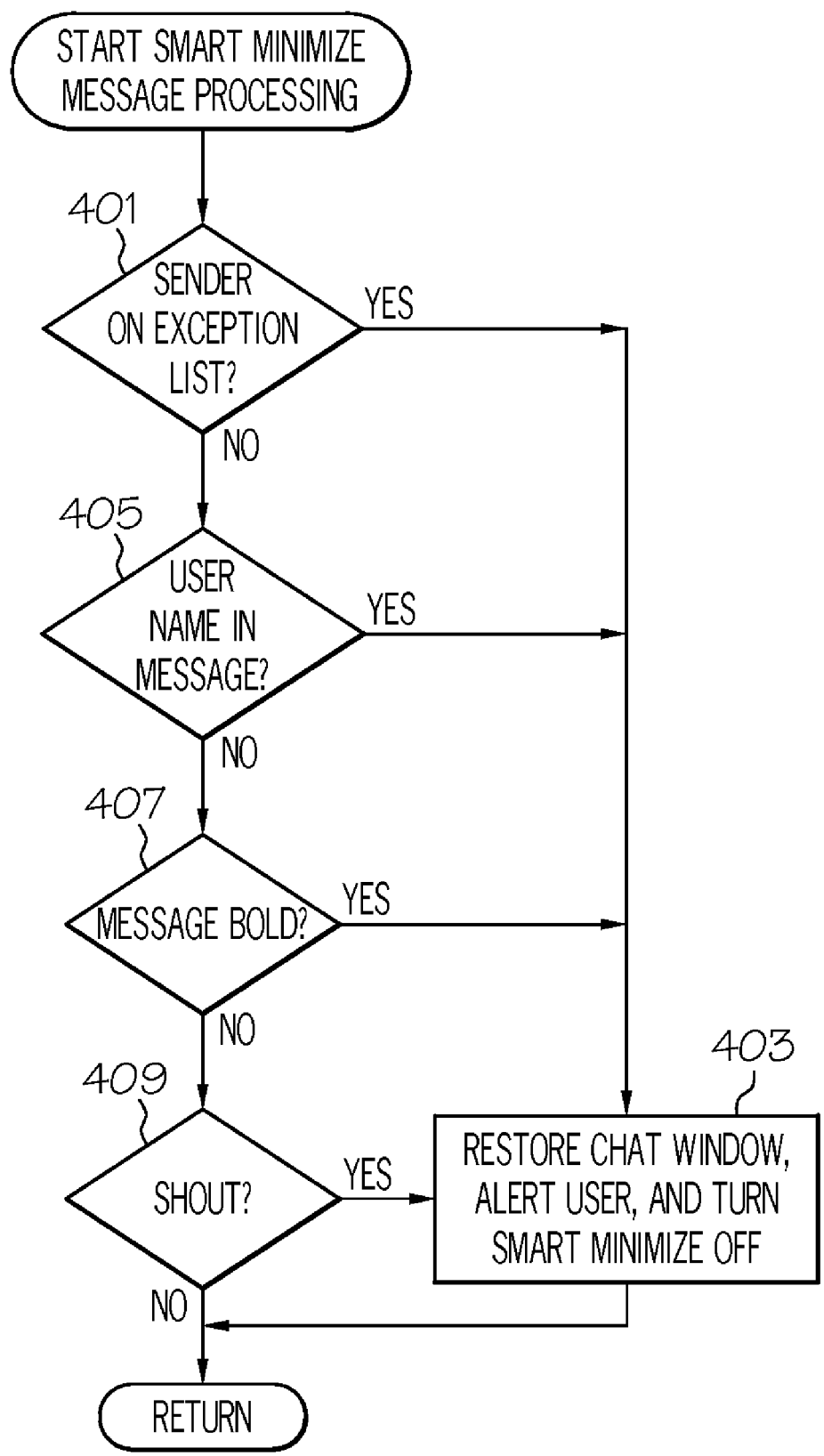
FIG. 4 is a flow chart of an embodiment of smart minimize message processing of FIG. 3; and, FIG. 5 is a block diagram of an information handling system adapted to embody systems and methods according to the present invention.

FIG. 4 is a flow chart of smart minimize message processing, which was indicated generally at block 317 of FIG. 3. Smart minimize message processing is performed when the chat client receives a message and smart minimize is on. The chat client determines, at decision block 401, if the sender of the message is on an exception list. An exception list is created by the user so that the user will be aware whenever he or she receives a message from a person listed on the exception list. Examples of people that would be listed on an exception list include managers, family members, and close friends. An exception list may be created automatically to include all persons in a management chain above the user. If, as determined at decision block 401, the sender of the message is on an exception list, the chat client restores the chat window, alerts the user, and turns smart minimize off for this sender, as indicated at block 403. The chat window is thus surfaced on the desktop at the top of the Z-order. The chat client may alert the user by sounding an audible tone. The chat client according to embodiments of the present invention is adapted to search incoming messages for the name of the user. If, as determined at decision block 405, the user's name appears on the incoming message, the chat client restores the chat client and turns smart minimize off for this message, as indicated at block 403. Thus, the user is able to ignore the chat session until he or she is specifically invited to comment or respond, as illustrated in FIG. 2.

Embodiments of the present invention may override the smart minimize mode when a message contains urgency indicia. For example, if, as determined at decision block 407, the message is in bold text, which is the chat equivalent of shouting, the chat client restores the chat window, alerts the user and turns off smart minimize, at block 403. Other urgency indicia may include all caps, underlined text, italic text, colored text, etc. Embodiments of the present invention may include shout function that explicitly overrides the smart minimize mode. If, as determined at decision block 409, the message was sent using shout button 215 of FIG. 2, the chat client restores the chat window, alerts the user and turns off smart minimize, at block 403.

Figure 5:
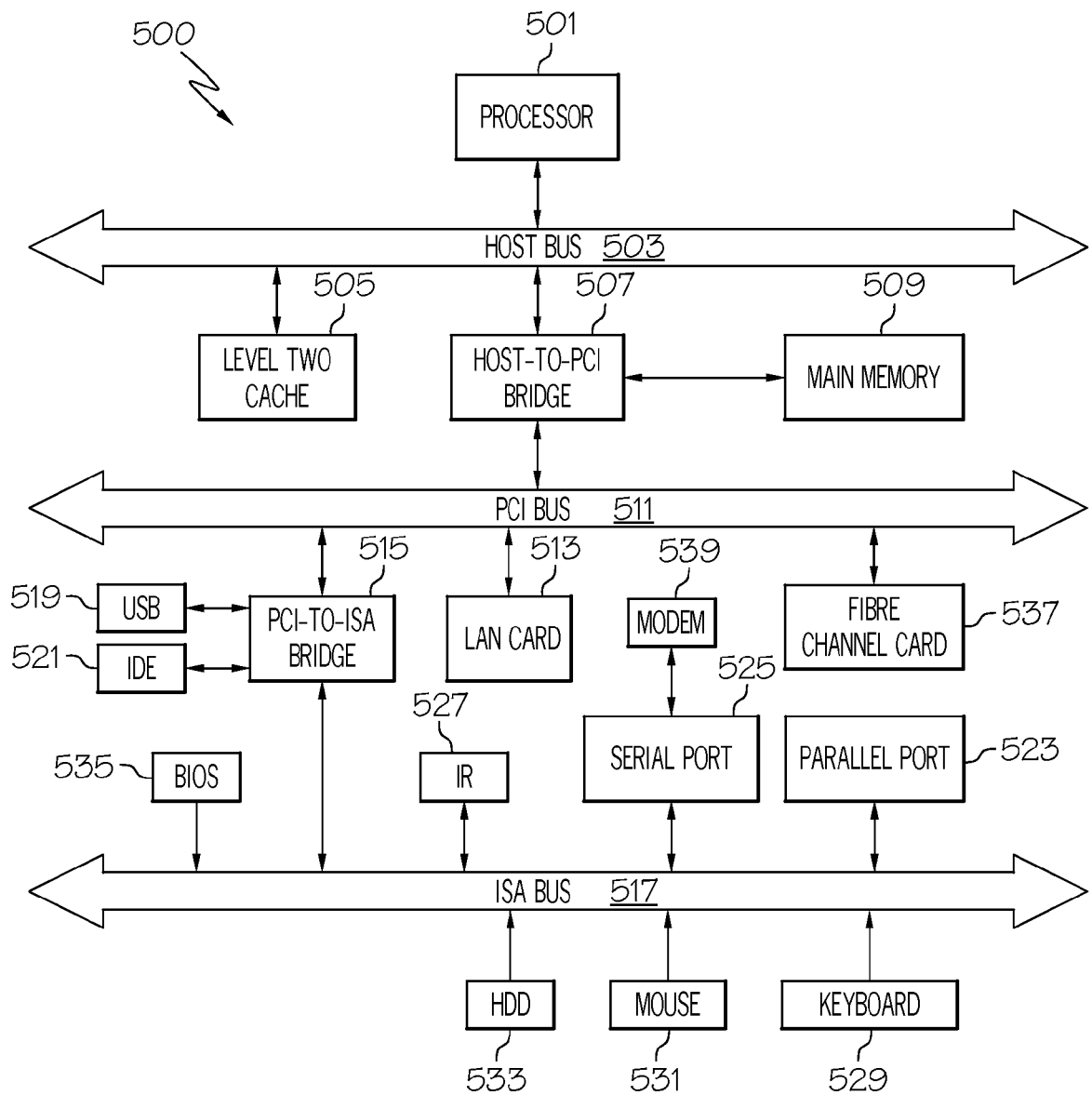

Referring now to FIG. 5, there is illustrated a block diagram of a generic information handling system 500 capable of performing the server and client operations described herein. Computer system 500 includes processor 501 which is coupled to host bus 503. Processor 501 preferably includes an onboard cache memory. A level two (L2) cache memory 505 is also coupled to host bus 503. A Host-to-PCI bridge 507 is coupled to host bus 503. Host-to-PCI bridge 507, which is coupled to main memory 509, includes its own cache memory and main memory control functions. Host-to-PCI bridge 507 provides bus control to handle transfers among a PCI bus 511, processor 501, L2 cache 505, main memory 509, and host bus 503. PCI bus 511 provides an interface for a variety of devices including, for example, a local area network (LAN) card 513, a PCI-to-ISA bridge 515, which provides bus control to handle transfers between PCI bus 511 and an ISA bus 517, a universal serial bus (USB) 519, and an IDE device 521. PCI-to-ISA bridge 515 also includes onboard power management functionality. PCI-to-ISA bridge 515 can include other functional elements not shown, such as a real-time clock (RTC), DMA control, interrupt support, and system management bus support.

Peripheral devices and input/output (I/O) devices can be attached to various interfaces or ports coupled to ISA bus 517. Such interfaces or ports may include a parallel port 523, a serial port 525, an infrared (IR) interface 527, a keyboard interface 529, a mouse interface 531, and a hard disk drive (HDD) 533.

A BIOS 535 is coupled to ISA bus 517. BIOS 535 incorporates the necessary processor executable code for a variety of low-level system functions and system boot functions. BIOS 535 can be stored in any computer readable medium, including magnetic storage media, optical storage media, flash memory, random access memory, read only memory, and communications media conveying signals encoding the instructions (e.g., signals from a network). In order to couple computer system 500 to another computer system to copy files or send and receive messages over a network, LAN card 513 may be coupled to PCI bus 511. Similarly, a Fibre Channel card may be coupled to PCI bus 513. Additionally, a modem 539 may be coupled to ISA bus 517 through serial port 525 to support dial-up connections.

While the computer system described in FIG. 5 is capable of executing the invention described herein, the illustrated system is simply one example of a computer system. Those skilled in the art will appreciate that many other computer system designs are capable of performing the invention described herein.

One of the preferred implementations of the invention is an application, namely, a set of instructions (program code) in a code module that may, for example, be in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A method of providing computer chat, which comprises:
   receiving user input from a user to activate an intelligent minimize function, wherein
   the user input comprises actuation of a smart icon depicted within a chat session window; wherein
   the smart icon is separate from a normal minimize button of the chat session window;
   minimizing the chat session window in response to the user activation of the intelligent minimize function, wherein
   the intelligent minimize function allows receipt of a message within the chat session window while the chat session window is minimized, without restoring said minimized chat session window unless the message has a predetermined characteristic; wherein
   said predetermined characteristic comprises a name of said user in a body of said message; and,
   restoring said minimized chat session window in response to a determination that said message has the predetermined characteristic.

2. The method as claimed in claim 1, wherein said predetermined characteristic comprises:
   a sender of the message is on an exception list.

3. The method as claimed in claim 1, wherein said predetermined characteristic comprises:
   at least a portion of said message is designated as urgent.

4. The method as claimed in claim 3, wherein
   said at least a portion of said message is designated as urgent by a special type font.

5. The method as claimed in claim 3, wherein
   said at least a portion of said message is designated as urgent by an indication that said message is sent from a sender using a shout button that is provided in addition to and separately from a normal send button.

6. The method as claimed in claim 1, further comprising:
   notifying participants in a chat session that said user has activated said intelligent minimize function.

7. The method as claimed in claim 6, wherein said notifying comprises:
   displaying to said participants an intelligent minimize indicator in association with said user.

8. A computer chat system, which comprises:
   a chat client implemented on a computer memory device, said chat client configured to:
   display a chat session window;
   display a smart icon within the chat session window, wherein
   the smart icon is separate from a normal minimize button of the chat session window; wherein
   user input from a user to actuate the smart icon activates an intelligent minimize function;
   minimize said chat session window in response to the user input to activate the intelligent minimize function, wherein
   the intelligent minimize function allows receipt of a chat message within the chat session window while the chat session window is minimized, without restoring said minimized chat session window unless the chat message has a predetermined characteristic; wherein
   said predetermined characteristic comprises a name of said user in a body of said chat message; and,
   restore said minimized chat session window in response to determining that the chat message has the predetermined characteristic.

9. The system as claimed in claim 8, wherein said predetermined characteristic comprises:
   a sender of the chat message is on an exception list.

10. The system as claimed in claim 8, wherein said predetermined characteristic comprises:
    at least a portion of said chat message is designated as urgent.

11. The system claimed in claim 10, wherein said at least a portion on said chat message is designated as urgent by a special type font.

12. The system as claimed in claim 10, wherein said
    at least a portion of said chat message is designated as urgent by an indication that said chat message is sent from a sender using a shout button that is provided in addition to and separately from a normal send button.

13. The system as claimed in claim 8, wherein said chat client is further configured to:
    notify participants in a chat session that said user has activated said intelligent minimize function.

14. The system as claimed in claim 13, wherein said chat client is further configured to:
    display to said participants an intelligent minimize indicator in association with said user.

15. An article of manufacture for implementing a method of computer chat, which comprises:
    a computer readable storage medium having computer readable code thereon, said computer readable code comprising:
    instructions for displaying a chat session window;
    instructions for displaying a smart icon within the chat session window, wherein
    user input from a user to actuate the smart icon activates an intelligent minimize function; wherein
    the smart icon is separate from a normal minimize button of the chat session window;
    instructions for minimizing said chat session window in response to the user input to activate the intelligent minimize function, wherein
    the intelligent minimize function allows receipt of a chat message within the chat session window while the chat session window is minimized, without restoring said minimized chat session window unless the chat message has a predetermined characteristic; wherein said predetermined characteristic comprises a name of said user in a body of said chat message; and, instructions for restoring said minimized chat session window in response to determining that the chat message has the predetermined characteristic.

16. The article of manufacture as claimed in claim 15, wherein at least a portion of said message is designated as urgent by an indication that said message is sent from a sender using a shout button that is provided in addition to and separately from a normal send button.

* * * * *